US011949531B2

(12) United States Patent
Yates et al.

(10) Patent No.: US 11,949,531 B2
(45) Date of Patent: Apr. 2, 2024

(54) SYSTEMS AND METHODS FOR PROACTIVE NETWORK DIAGNOSIS

(71) Applicant: Cox Communications, Inc., Atlanta, GA (US)

(72) Inventors: Shane Yates, Atlanta, GA (US); Joseph Keller, Atlanta, GA (US); Christian Welin, Atlanta, GA (US); Sam Plant, Atlanta, GA (US); Tuba Aktaran-Kalayci, Atlanta, GA (US); Drew Milley, Atlanta, GA (US); Brian Stublen, Atlanta, GA (US); Alexis Hwang, Atlanta, GA (US); Mohammad Khabbazian, Atlanta, GA (US); Will Gao, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 17/112,808

(22) Filed: Dec. 4, 2020

(65) Prior Publication Data

US 2022/0182254 A1 Jun. 9, 2022

(51) Int. Cl.
*H04L 12/28* (2006.01)
*G06N 20/00* (2019.01)
*H04N 7/173* (2011.01)
*H04N 21/4425* (2011.01)
*H04N 21/61* (2011.01)

(52) U.S. Cl.
CPC ......... *H04L 12/2801* (2013.01); *G06N 20/00* (2019.01); *H04L 12/2856* (2013.01); *H04N 7/17309* (2013.01); *H04N 21/4425* (2013.01); *H04N 21/6118* (2013.01)

(58) Field of Classification Search
CPC ............ H04L 12/2801; H04L 12/2856; H04N 7/17309; H04N 21/6118; G06N 20/00
See application file for complete search history.

(56) References Cited

U.S. PATENT DOCUMENTS

| 10,142,587 B1* | 11/2018 | Godas | H04L 41/0213 |
| 10,666,996 B1* | 5/2020 | Nair | H04N 21/6118 |
| 2003/0126256 A1* | 7/2003 | Cruickshank, III | H04L 41/32 709/224 |
| 2005/0262237 A1* | 11/2005 | Fulton | H04L 43/0882 709/224 |

(Continued)

*Primary Examiner* — Michael H Hong
(74) *Attorney, Agent, or Firm* — Eversheds Sutherland (US) LLP

(57) ABSTRACT

Embodiments of the present disclosure provide methods, systems, apparatuses, and computer program products for proactive network diagnosis. An example method may include determining, by one or more processors, telemetry data and streaming trap data indicative of a group of cable modem devices being disconnected from a cable network. The example method may include determining, based on the telemetry data and streaming trap data, a first network node device of the group of network node devices. The example method may include generating first performance data associated with the first network node device. The example method may include determining, based on a comparison between the first performance data and an event criterion, an occurrence of an event associated with the first network node device.

15 Claims, 7 Drawing Sheets

(56) References Cited

U.S. PATENT DOCUMENTS

| | | | | |
|---|---|---|---|---|
| 2009/0158096 | A1* | 6/2009 | Ali | H04L 65/611 |
| | | | | 714/E11.179 |
| 2010/0011255 | A1* | 1/2010 | de Kleer | G06Q 10/04 |
| | | | | 714/47.1 |
| 2011/0138291 | A1* | 6/2011 | Twiddy | H04L 41/0213 |
| | | | | 715/735 |
| 2014/0123203 | A1* | 5/2014 | Oliver | H04N 7/102 |
| | | | | 725/125 |
| 2014/0129876 | A1* | 5/2014 | Addepalli | H04L 41/0677 |
| | | | | 714/E11.029 |
| 2015/0311974 | A1* | 10/2015 | Thompson | H04B 3/235 |
| | | | | 398/13 |
| 2017/0033974 | A1* | 2/2017 | Shashank | H04L 41/0631 |
| 2018/0309639 | A1* | 10/2018 | Birkner | H04L 41/14 |
| 2019/0342613 | A1* | 11/2019 | Gutterman | H04N 17/004 |
| 2020/0084088 | A1* | 3/2020 | Zhu | H04L 41/0668 |
| 2020/0186440 | A1* | 6/2020 | Towfiq | H04L 41/5032 |
| 2022/0109612 | A1* | 4/2022 | Bush | H04L 12/2801 |

* cited by examiner

SYSTEMS AND METHODS FOR PROACTIVE NETWORK DIAGNOSIS

TECHNICAL FIELD

The disclosure generally relates to proactive network diagnosis. In some embodiments, the disclosure may more specifically relate to proactive network diagnosis on Data Over Cable Service Interface Specification (DOCSIS) networks.

BACKGROUND

A wide variety of network service providers may establish communication networks to connect customer-premises equipment or customer-provided equipment (CPE) to one or more networks such as DOCSIS networks. Traditionally deploying and maintaining such communication networks may require reliable communication between components of a network, which may be costly to deploy and maintain. In some instances, networks (e.g., DOCSIS networks) may experience impairments, outages, and/or intermittent disconnection issues, which may result in reduced user experience. Typically such network issues may be identified after the issues have occurred by users (e.g., customers) informing (e.g., by calling, emailing, or the like) the network service providers about the issues. The network service providers may dispatch technicians to a local location where an issue has occurred to determine whether the issue is originated from services with the network or with an individual CPE. Therefore, the conventional system and methods are time-consuming and are incapable of identifying network issues timely, efficiently, and accurately.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
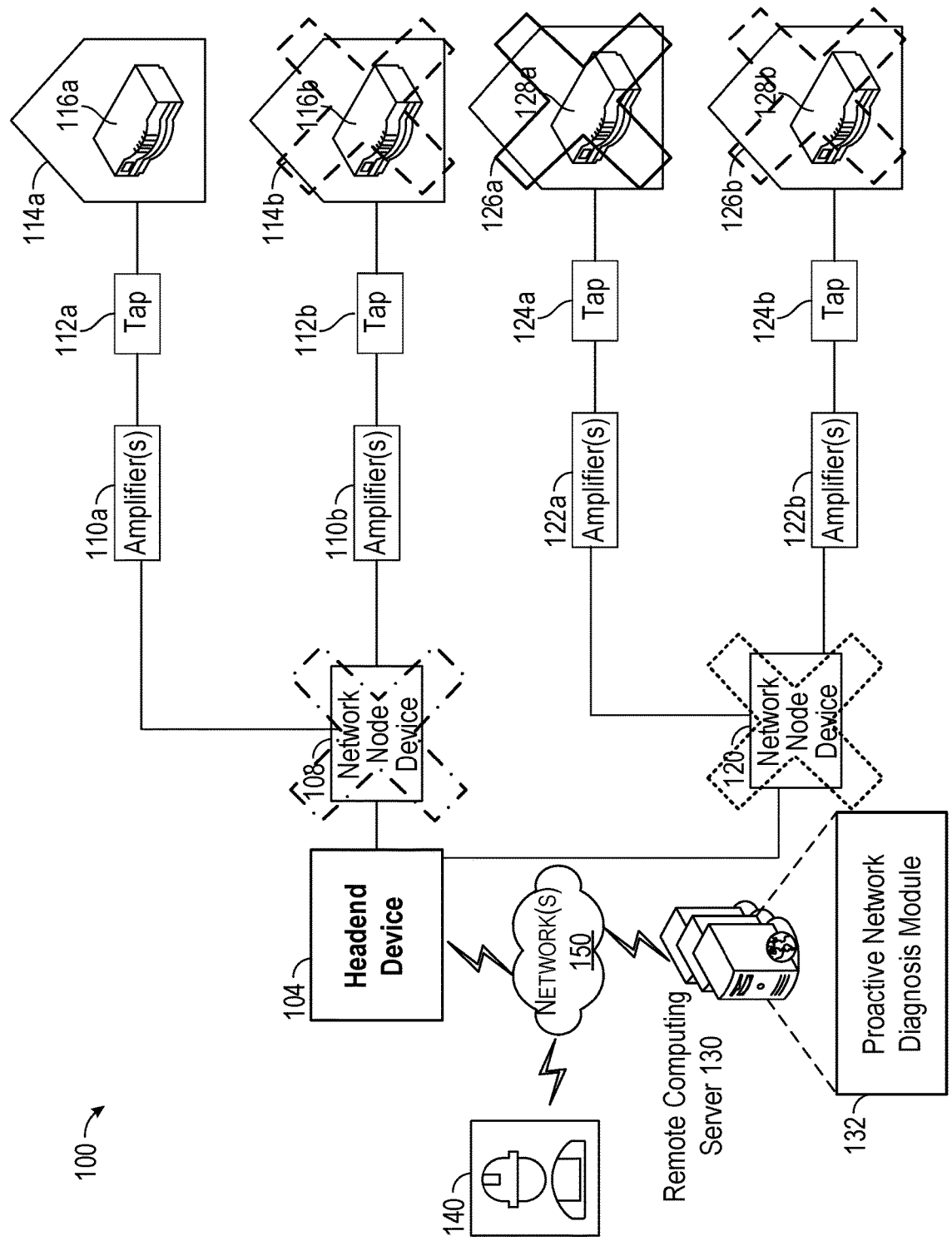
FIG. 1 depicts an illustrative system for proactive network diagnosis in a cable network, in accordance with example embodiments of the disclosure.

Illustrative embodiments will now be described more fully hereinafter with reference to the accompanying drawings, in which some, but not all embodiments are shown. The disclosure may be embodied in many different forms and should not be construed as limited to the embodiments set forth herein; rather, these embodiments are provided so that this disclosure will satisfy applicable legal requirements. Like numbers refer to like elements throughout.

Example aspects of the present disclosure are directed to methods and systems for proactive network diagnosis. A sustained offline condition may describe a state that a device is completely off (e.g., a node outage or the like). The sustained offline condition may also be a chronic issue initially manifesting intermittent network issues, such as a node may intermittently go offline and recover multiple times over course of a given time period before the node is offline for a sustained period, or signal degradations may result in increasingly frequent service interruptions specific to the services being utilized by the customer. Typically, the intermittent network issues may not be isolated and understood for determining whether or not a sustained offline condition will occur until the sustained offline condition has occurred. Proactive network diagnosis may diagnose and identify issues (e.g., node outage and/or other sustained offline condition issues) within a DOCSIS network before the sustained offline condition has occurred and/or before users (e.g., customers) report the issues by analyzing comprehensive data associated with one or more network components associated with a given node (e.g. line extenders, amplifiers, taps, etc.) to predict whether or not the sustained offline condition will occur, which may provide improved service impairment or sustained offline condition detection early, timely, efficiently, and accurately.

For instance, an intermittent network issue may occur during a random time period (e.g., every day at 3 am or 3 pm) and may last for a certain time period (e.g., one or more hours), and then the issues may be gone. Conventionally, a user may report the intermittent network issue (e.g., by contacting a network service provider). A technician may be dispatched to a location where the intermittent network issue has occurred. However, the technician may not find the root cause of the issue or even confirm that there is an issue as the underlying cause may have subsided by the time the technician arrives at the location. After the technician leaves, the issue may reoccur. The conventional methods may require users to report issues after the issues have occurred and may also require technicians to physically go to the location to identify whether the issues originate from problems in the network or within an individual customer's premise (e.g. tap, drop, demark, inside wiring, etc.) after the technician visits the location multiple times to isolate the root cause of the issues. However, some users may keep silent about intermittent network issues, and those users may not report any issues until a network service and/or device experiences a sustained offline condition. Thus, the conventional methods may be incapable of identifying issues in a timely or efficient manner before users report the issues and/or before the technician physically goes to locations to isolate root cause.

According to example aspects of the present disclosure, the systems and methods of the present disclosure may aggregate comprehensive data associated with a DOCSIS network and utilize the aggregated data to automatically determine an occurrence of an event (e.g., a sustained offline condition for a node will occur, an intermittent network issue has occurred for a node, an intermittent network issue has been occurring for a node, or the like). For example, a system may compare the comprehensive data with one or more control thresholds. A control threshold may describe a value or a value range for determining an occurrence of an event. If the comprehensive data deviates from one or more control thresholds (e.g., exceeding one or more control thresholds), the system may determine an occurrence of an event. If the comprehensive data does not deviate from one or more control thresholds, the system may determine that the event is not occurring, has not occurred, or will not occur. For example, if the comprehensive data deviates from a first group of control thresholds, the system may determine that intermittent network issues have been occurring or have occurred. If the comprehensive data further deviates from a second group of control thresholds, the system may determine that a sustained offline condition has occurred. If the comprehensive data does not deviate from the first group of control thresholds, the system may determine that intermittent network issues have not occurred. If the comprehensive data does not deviate from the second group of control thresholds, the system may determine that the sustained offline condition will not occur.

Figure 2A:
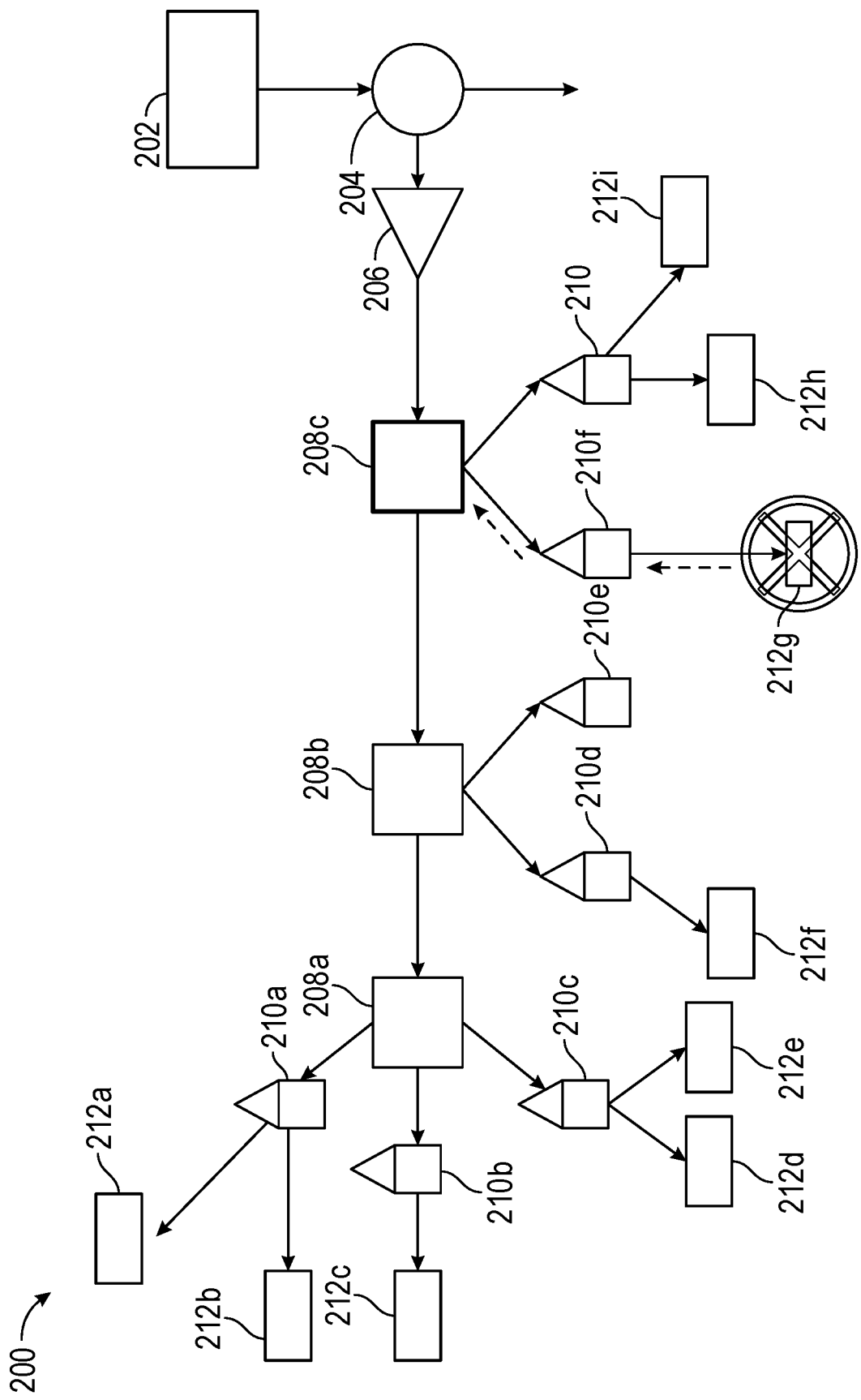
FIGS. 2A-2B depict an example device polling process, in accordance with one or more example embodiments of the disclosure.
Figure 2B:
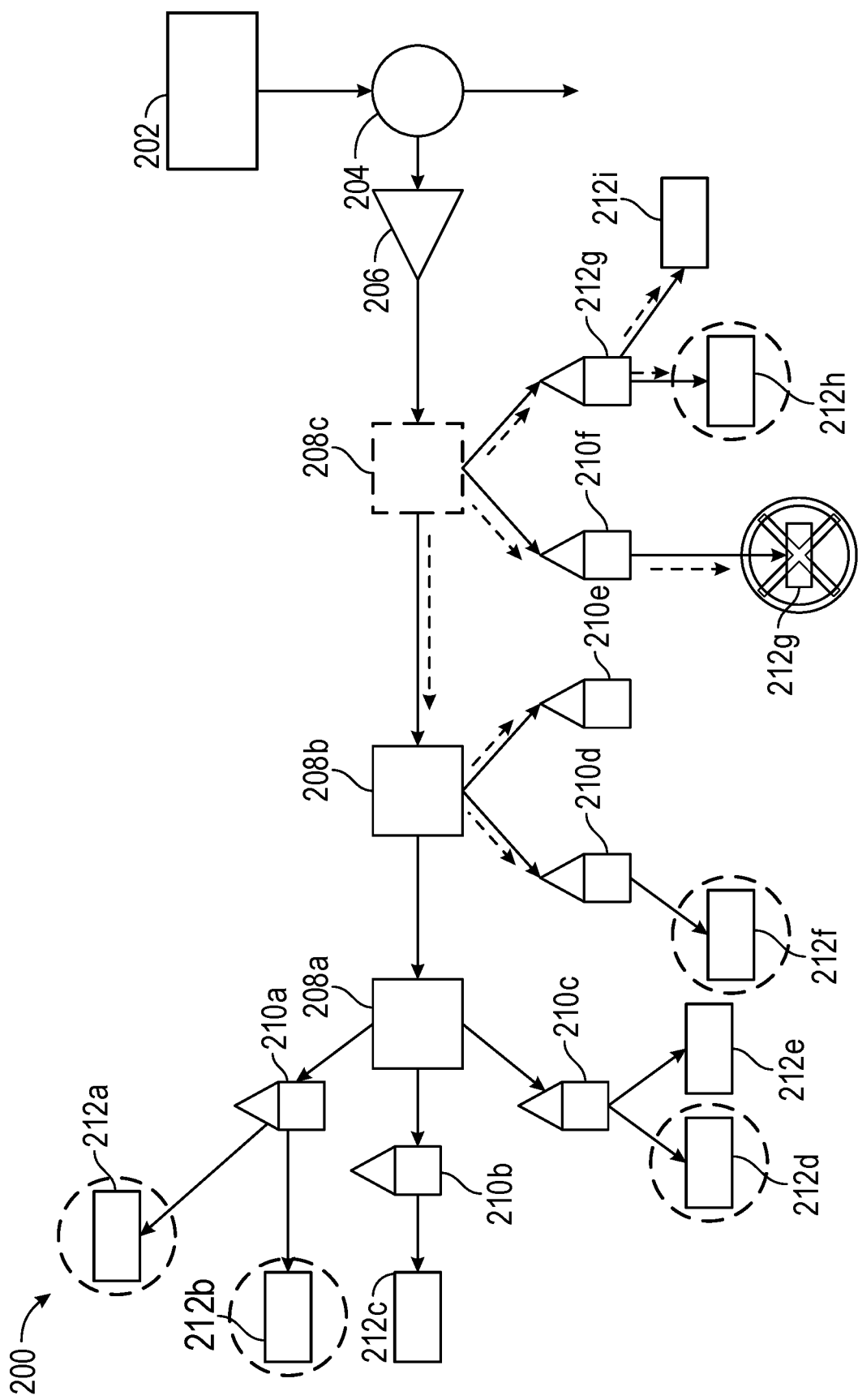

The comprehensive data may include device data (e.g., identification data, performance data, or the like) associated with a cable modem termination system (CMTS), one or more network node devices, one or more taps, one or more CPEs, one or more cable modem (CM) devices, and/or any relevant devices within a DOCSIS network, streaming data that may determine bandwidth allocation or the amount of data a user consumes, telemetry data obtained from an intelligent polling process (this intelligent polling may be described in more detail in the process outlined in FIGS. 2A-2B), and/or any relevant data associated with the DOCSIS network. Identification data may include a MAC address, a device status, a device DOCSIS profile, a channel frequency, a modulation profile, a modulation type, a channel bandwidth, and/or any relevant data for identifying a device. Performance data may include forward error correction information, upstream/downstream data transfer rates, signal-to-noise ratios (SNRs), modulation error ratios, measurement data to characterize one or more channels associated with signals outputted by CPEs (e.g., slopes measurement data, amplitude measurement data, ripple measurement data, spike (for example, non-linear noise distortions) measurement data, absolute received power per subcarrier measurement data, error vector magnitude measurement data, and the like), device power levels, CMTS power levels, a CMTS equalization coefficient, a device equalization coefficient, and/or any relevant data associated with a performance of the above devices. The CMTS equalization coefficient and device equalization coefficient may relate to the pre-equalization of devices within the DOCSIS network. Pre-equalization may be a DOCSIS feature that may improve upstream performance in the presence of network impairments. At a high level, pre-equalization is performed as follows. To begin, a first device (for example, a CMTS) analyzes messages coming from a second device (for example, a cable modem) and evaluates the signal quality of the messages. If the first device determines that the messages can be improved by pre-equalization, the first device sends equalizer adjustment values to the second device. The second device applies these equalizer adjustment values, called coefficients, to its pre-equalizer. The result is that the second device may then transmit a pre-distorted signal to compensate for impairments between the second device and the first device. As the pre-distorted signal traverses the network it will experience the effects of radio frequency (RF) impairments. By the time the pre-distorted signal from the second device arrives at the first device, it will no longer have any of the original pre-distortion, as the RF impairments will have transformed it back into a near-ideal signal at the first device. If further adjustments are required, the first device may send more pre-equalizer coefficient values to the second device and the cycle may repeat. With this in mind, and in some instances, the CMTS equalization coefficient may be an equalization coefficient used by a CMTS for data transfer from the CMTS to another device, and the device equalization coefficient may be an equalization coefficient used by a device.

In some embodiments, the system may determine the comprehensive data via one or more polling processes. For example, CMTS may send a poll request to the CPE device and the CPE device may send telemetry data to the CMTS. In some embodiments, the CMTS may send the poll request in substantially real-time or at a predefined time interval (e.g., 15-minute interval or any relevant time interval for the polling process), which may provide an efficient way to monitor one or more CPE statuses. CPE statuses may then be aggregated in association with a given tap (e.g., a tap may be a device that connects individual locations to a cable network, such as a hybrid fiber-coaxial network). A similar polling process may be performed for other devices (e.g., CPE devices, node devices, or any relevant devices in a network). In some embodiments, if there is a change in a state (e.g., on/off state) of a CPE device (e.g., CM device or the like), the CPE device may be triggered to generate streaming trap data indicative of the change. A trap of the cable network (e.g., an SNMP (Simple Network Management Protocol) trap) may be a frequently used alert message sent from a remote device (e.g. a cable modem or set top box) to a central collector (e.g. a CMTS) that is the SNMP manager. Streaming trap data may represent a constant streaming source of data that can be collected and aggregated to isolate lowest common failure points on the cable network (e.g., the hybrid fiber coaxial network). For example, streaming trap data may be captured by the CMTS using SNMP communications.

In some embodiments, the system may attribute one or more offline traps that have been detected representing intermittent network issues (e.g., intermittently off) and/or sustained offline conditions (e.g., completely off) to a specific node based on the comprehensive data. For example, the system will track on-off status for CPE devices collected via SNMP traps, representing intermittent or sustained offline events isolated to a specific portion of the hybrid fiber coaxial network topology. Impairments are isolated to the lowest common component of the network by comparing offline or intermittently offline devices to engineering diagrams representing the latitude and longitude coordinates of passive and active network devices. These lowest common components may be passive taps, line extenders, amplifiers or nodes. The system may combine this trap data with polling data to identify patterns of degradation that are evidence of imminent network failures, isolating the source of these failures to individual or multiple network components. The system may then inform users of imminent or current intermittent impairments or sustained offline conditions and may also dispatch technicians to fix issues that may result in the outage.

In some embodiments, the system may determine that a given CPE has not been online for a sustained time period. In such instances, the device represents either a disconnected customer or has been powered down. In order to prevent a false-positive outage event, such devices are removed from a list of active CPEs. For example, the system may check the status of a CPE device on a recurring and/or daily basis. If the CPE device has not been on the network for a predefined time period (e.g., greater than three days or the like), the system may remove the CPE from a list of active devices, thereby preventing a false-positive outage event.

In some embodiments, the system may determine whether intermittent network issues have occurred for the specific node and/or whether a sustained node outage will occur. For example, based on the above-node attribution, the system may determine data (e.g., device data, streaming data, and telemetry data) associated with the node. The system may compare the data with one or more control thresholds. If the data deviates from the one or more control thresholds (e.g., exceeding the one or more control thresholds), the system may determine that the node has been experiencing or has s experienced intermittent network issues and/or a sustained node outage will occur. If the data does not deviate from the one or more control thresholds, the system may determine that intermittent network issues have not occurred and/or a sustained node outage will not occur. A sustained outage may describe a situation where a node and all CPE devices serviced by that node may be completely offline or may be offline for a certain time period (e.g., 10 to 15 minutes) and then the node may be restored to an online state, and where that issue may reoccurring an intermittent fashion, which may ultimately result in the sustained node outage with the node being completely offline for a sustained and non-intermittent time period. In some embodiments, the system may determine a pattern of degradation associated with performance data (e.g., upstream transmitting and receiving levels, downstream transmitting and receiving levels, upstream and downstream signal -to-noise ratios, the above-described performance data associated with the node, or any relevant data to a performance of the node) and/or streaming data that will ultimately lead to the intermittent network issues and/or a sustained node outage. A pattern may indicate a distribution (e.g., a statistical distribution, or the like) of the various types of performance data. For example, the system may measure various types of performance data and generate a pattern indicative of distribution (e.g., a statistical distribution, or the like) of the various types of performance data. The system may determine a pattern based on current performance data associated with the node and compare the pattern with a historical pattern including historical data associated with the intermittent network issues and the sustained node outage. The historical data may include historical performance data, user behavior data associated with the node (e.g., reporting issues in a geographical region associated with the node), and any relevant data associated with the node. User (e.g., service subscriber) behavior data may include a call log indicative of whether or not users associated with a given node have called a service provider to report intermittent network issues and/or a sustained node outage.

In some embodiments, the system may determine the pattern indicative of a change of performance data over a time period. For example, the system may measure particular performance data (e.g., signal -to-noise ratio, or any relevant performance data) over a time period and the system may generate a pattern indicative of a function of the performance data versus time (e.g., via plotting or any statistical methods). Additionally, and/or alternatively, the system may determine a pattern indicative of a distribution of CPEs (e.g., CPEs having intermittently off and/or completely off) associated with a specific node.

In some embodiments, the system may generate a machine learning model. The system may train the machine learning model using historical data (e.g., known patterns, historical performance data) and associated intermittent network issues and sustained node outage. The system may input a detected pattern or measured performance data into the trained machine learning model and the trained machine learning model may output a likelihood indicative of how probable an event is to occur (e.g., how likely the intermittent network issues will occur and/or how likely a sustained node outage will occur). In some embodiments, the system may use the historical data to train a machine learning model to classify a node into different classifications (e.g., a classification indicative of nodes having been experiencing intermittent network issues, a classification indicative of nodes having experienced intermittent network issues, a classification indicative of nodes will experience a sustained node outage, a classification indicative of a bad node that is completely off, a classification indicative of a healthy node, or the like). The system may input a detected pattern or measured performance data into the trained machine learning model and the trained machine learning model may output a likelihood indicative of a classification associated with a specific node.

For instance, a user (e.g., service subscriber) may start up an old television at 3:00 p.m. on every Saturday, which may bring down an entire node because the old television may introduce signal noise or ingress into the network through a cracked coaxial cable, introducing a sustained offline event. The system may determine that a node has been experiencing and/or experienced intermittent network issues periodically based on performance data associated with the node. The system may determine a pattern using the performance data and determine that a sustained node outage will occur based on the pattern. The system may dispatch technicians to the location where intermittent network issues have occurred to fix the issues.

In some embodiments, the system may take actions based on where the intermittent network issues have occurred for a specific node or a sustained node outage may occur. For example, the system may allocate resources based on data associated with the specific node and may dispatch a technician to locations associated with the specific node. In this way, resources (e.g., a reduced number of trucks, technicians, or the like) may be allocated more efficiently. In some embodiments, the system may send information associated with the issues and the node in substantially real-time or real-time to technicians to facilitate the process of technicians fixing associated issues such that the technicians may have an ability to actively check levels in the network, leveraging their signal meters. For example, the system may send a point of failure for the issues to technicians. As another example, the system may generate a graphical representation of a network topology overlaid with the points of failure to expedite isolation of the impairment to a component failure indicative of the root cause of the intermittent or sustained network outage or impairment Particular embodiments of the subject matter described herein can be implemented to realize one or more of the following advantages, the system does not require a user to report issues, but the system may provide a timely and efficient way by automatically and dynamically determining whether or not the issues have occurred or specifying the probability that issues will occur. The system may not only use data associated with a node but also use comprehensive data associated with various devices that are connected to the node, which may determine whether or not the node has and/or will have issues with heightened accuracy. In addition, the system may predict whether or not a sustained offline issue (e.g., a sustained node outage) will occur, which provides early detection of the imminent sustained offline condition prior to occurrence of these issues such that the service provider may resolve the root cause before customers' services are impaired or the network experiences a sustained offline event. The system may also allocate human resources (e.g., field technicians) more efficiently based on the identified and isolated issues, thereby, reducing the costs associated with deploying and maintaining networks and in turn increasing profit margin.

Other embodiments of this aspect include corresponding systems, apparatuses, and computer programs configured to perform the actions of the methods encoded on computer storage devices.

The details of one or more embodiments of the subject matter described herein are outlined in the accompanying drawings and the description below. Other features, aspects, and advantages of the subject matter will become apparent from the description, the drawings, and the claims.

Various embodiments of the present disclosure will now be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense unless otherwise indicated. The terms "illustrative" and "example" are used to be examples with no indication of quality level. Like numbers refer to like elements throughout. Arrows in each of the figures depict bi-directional data flow and/or bi-directional data flow capabilities.

Embodiments of the present disclosure may be implemented in various ways, including computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media includes all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD)), state card (SSC), state module (SSM), enterprise flash drive, magnetic tape, or any other non-transitory magnetic medium, cloud-based storage (e.g. an object storage or database through a web service interface, or any other cloud-based storage) and/or the like. A non-volatile computer-readable storage medium may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 1 depicts an illustrative system 100 for proactive network diagnosis in a cable network, in accordance with example embodiments of the disclosure. In some aspects, the cable network of the system 100 described herein may be implemented using a DOCSIS specification or equivalent specification. In some embodiments, the cable network may include a fiber optic network that may extend from a headend out to a neighborhood's hub site, and finally to a coaxial cable node which serves customers at several households, for example, 25 to 2000 households. As shown in FIG. 1, a headend device 104 is connected to a first network node device 108 and a second network device 120. The first network node device 108 connects DOCSIS CPEs (e.g., Cable Modem devices, Set top Box devices, embedded Multi-Media Terminal Adapter devices) 116a and 116b at households 114a and 114b via amplifiers 110a and 110b and taps 112a and 112b. The first network node device 120 connects CPEs 128a and 128b at households 126a and 126b via amplifiers 122a and 122b and taps 124a and 124b. The headend device 104, a remote computing server 130, and a service server 140 communicate with each other via a network 150.

The headend device 104 may include a CMTS. The headend device 104 may include a converged cable access platform (CCAP) device. CCAP may refer to equipment that combines aspects of the functionality of edge quadrature amplitude modulation (QAM) technology with CMTSs to provide services such as internet and voice over the Internet Protocol (IP) while encoding and transmitting digital video channels over the cable network. The headend device 104 may be configured to provide a downstream signal (e.g., a downstream broadband signal) to the CPEs 116a, 116b, 128a, and 128b, and receive upstream signals from the CPEs 116a, 116b, 128a, and 128b. For example, the headend device 104 may be configured (i) to receive the downstream signal for a source (not shown in FIG. 1) that may electronically connect the headend device 104, (ii) convert the downstream signal into a radio frequency downstream signal, (iii) output the downstream signal onto the first and second network node devices 108 and 120 for communication to the CPEs 116a, 116b, 128a, and 128b, (iv) receive the upstream signals from the CPEs 116a, 116b, 128a, and 128b via the first and second network node devices 108 and 120, and (v) convert the received upstream signals into light signals for communication to the headend device 104. In some embodiments (not shown in FIG. 1), the headend device 104 may include a switch, for example, a network switch such as an Ethernet switch.

A network node device (e.g., the first network node device 108 or the second network node device 120) may be a device capable of creating, receiving, or transmitting information over a communications channel in a cable network as either a redistribution point or a communication endpoint. The network node device such as remote physical (PHY) device, remote medium access control (MAC) device, and/or remote hybrid PHY/MAC device. The remote PHY device may be a device having PHY layer functionality (that is, PHY layer functionality as described in connection with the open systems interconnection model, OSI model. As shown in FIG. 1, the first and second network node devices 108 and 120 are external to the headend device 104. The first and second network node devices 108 and 120 may be electronically connected to the headend device 104 via a cable (e.g., a fiber optic cable). In some embodiments (not shown in FIG. 1), the first and second network node devices 120 may be included in the headend device 104. As shown in FIG. 1, the cable network of the system 100 shows one of embodiments having two node splits corresponding to each of the first and second network node devices. In some embodiments (not shown in FIG. 1), the system 100 may include a cable network having X node splits indicating X number of groups are connected to a given node. For instance, the first network device 108 may connect a single household having one or more CPEs. The second network device 120 may connect to more than two households, each having one or more CPEs. Examples of X node splits are further described in FIG. 7. In some embodiments (not shown in FIG. 1), the first network node device 108 or the second network node device 120 may include a switch, for example, a network switch such as an Ethernet switch.

The amplifier(s) 110a, 110b, 122a, and 112b may amplify signal. For example, the amplifier(s) 110a, 110b, 122a, and 112b may increase the amplitude of the signal. In certain embodiments, the various components of a signal (e.g., low return path, forward path, high return path) may be amplified by respective amplification components of the amplifier(s) 110a, 110b, 122a and 112b. Each amplified signal may then be output onto or driven back onto the cable line in a direction for the signal. Any number of diodes or other suitable devices may be incorporated into the amplifier(s) 110a, 110b, 122a, and 112b in order to prevent or limit undesired leakage of an amplified signal in a direction from which the signal was received. For example, the amplifier(s) 110a and 110b may receive a return path signal from the households 114a and 114b via the taps 112a and 112b, the amplifier(s) 110a and 110b may amplify the signal, and the amplifier(s) 110a and 110b may output the signal in an upstream direction towards the headend device 104 while limiting the output or leakage of the signal in a downstream direction. The amplifier(s) 122a and 122b may have similar structure and perform similar functions to the amplifier(s) 110a and 110b.

In some embodiments, the amplifier(s) 110a, 110b, 122a, and 112b may include a wide variety of gains that may be utilized for different components of a signal. In certain embodiments, the amplifier(s) 110a, 110b, 122a, and 112b may be powered by a received signal, such as a received downstream signal. Additionally or alternatively, the amplifier(s) 110a, 110b, 122a, and 112b may be powered by one or more batteries and/or external power sources. In certain embodiments, the power requirements of the amplifier(s) 110a, 110b, 122a, and 112b may be based at least in part on the modulation technique(s) utilized in association with the signals that are amplified. In one example embodiment, a relatively low power amplifier(s) 110a, 110b, 122a, and 112b may be provided in association with an OFDMA modulation technique. In some embodiments, a variable number of amplifiers may be located between a network node device (e.g., the first network node device 108 or the second network node device 120) and a tap (e.g., the tap 112a, 112b, 124a, or 124b).

A tap (e.g., the tap 112a, 112b, 124a, or 124b) may be a hardware device (e.g., a passive device) that connects a number of households each having one or more CPEs. For example, as shown in FIG. 1, a single tap connects a single household. In some embodiments (not shown in FIG. 1), a single tap may connects more than one households each having one or more CPEs.

Any number of modulation techniques and/or data standards may be utilized by the cable network of the system 100. For example, television data may be modulated utilizing a suitable quadrature amplitude modulation (QAM) or other modulation technique, and the modulated data may be incorporated into data signal (e.g., broadband data signal). As another example, an orthogonal frequency-division multiple access (OFDMA) technique, a time division multiple access (TDMA) technique, an advanced time division multiple access (ATDMA) technique, a synchronous code division multiple access (SCDMA) technique, or another suitable modulation technique or scheme may be utilized to modulate data included within the data signal. The data signal may be configured to provide a wide variety of services to one or more households, including but not limited to, television service, telephone service, Internet service, home monitoring service, security service, etc.

A CPE (e.g., the CPE 116a, 116b, 128a, or 128b) may be any terminal and associated equipment located at a subscriber's premises and connected with a carrier's telecommunication circuit at a point established in a building or complex to separate customer equipment from the equipment located in either the distribution infrastructure or central office of the communications service provider. Examples of a CPE may include CM devices, telephones, routers, network switches, residential gateways (RG), set-top boxes, fixed-mobile convergence products, home networking adapters, and Internet access gateways that enable consumers to access providers' communication services and distribute them in a residence or enterprise with a local area network (LAN). In some embodiments, a CPE may be an active equipment, as the ones mentioned above, or passive equipment such as analog telephone adapters (ATA) or xDSL-splitters (e.g., xDSL refers to the sum total of digital subscriber line (DSL) technologies). The CPEs may provide upstream signals to the headend device 104 via a respective tap, respective amplifiers, and a respective network node device.

The remote computing server 130 may communicate with the headend device 104 and the service server 140 using one or more communication networks 150. The remote computing server 130 may be one or more remote cloud-based on computers/servers, and/or network-based on computers/servers. The remote computing server 130 may include a proactive network diagnosis module 132 and one or more relevant modules (not shown in FIG. 1, e.g., communications modules configured to communicate with components inside and outside the remote computing server 130).

In one or more embodiments, the one or more communications networks 150 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the one or more communications networks 150 may have any suitable communication range associated therewith and may include, for example, global networks (e.g., the Internet), metropolitan area networks (MANs), wide area networks (WANs), local area networks (LANs), or personal area networks (PANs). In addition, any of the one or more communications networks may include any type of medium over which network traffic may be carried including, but not limited to, coaxial cable, twisted-pair wire, optical fiber, a hybrid fiber-coaxial (HFC) medium, microwave terrestrial transceivers, radio frequency communication mediums, white space communication mediums, ultra-high frequency communication mediums, satellite communication mediums, or any combination thereof.

The proactive network diagnosis module 132 may include at least one processor and at least one memory storing computer-executable instructions that when executed by the at least one processor, cause the at least one processor to aggregate comprehensive data obtained from the headend device 104 via a polling process described in FIGS. 2A and 2B and trap data associated with the CPEs 116a, 116b, 128a, and 128b, and to utilize the aggregated data to automatically determine an occurrence of an event (e.g., a sustained node outage, a node has been experiencing an intermittent network issue, and/or a node having experienced an intermittent network issue). As shown in FIG. 1, the proactive network diagnosis module 132 may aggregate comprehensive data obtained from the headend device 104 and trap data associated with the CPEs 116a, 116b, 128a, and 128b. The proactive network diagnosis module 132 may attribute one or more CPEs have been experiencing or experienced intermittent network issues (e.g., a CPE has an off status for a short time period, and then the CPE is back to an on-status) and/or D (e.g., a CPE has an-off status for a sustained time period) to a specific node based on the comprehensive data. For example, based on the polling process described in FIGS. 2A and 2B and trap data, the proactive network diagnosis module 132 may track on-off status for the CPEs 116a, 116b, 128a, and 128b. The proactive network diagnosis module 132 may capture data associated with the CPEs having intermittently off and/or completely off issues and then may associate such CPEs having the same node such that the proactive network diagnosis module 132 may determine whether or not an associated node that is represented by all those different devices is mostly like to have intermittent network and/or sustained offline conditions. As shown in FIG. 1, a dashed cross may indicate that the CPE device 116b or 128b has an intermittently off issue. A solid cross may indicate that the CPE device 128a has a sustained off condition. The proactive network diagnosis module 132 may attribute data associated with the CPE device 116b to the first network node device 108. The proactive network diagnosis module 132 may attribute data associated with the CPEs 128a and 128b to the second network node device 120.

In some embodiments, for each of the first network node device 108 and the network node device 120, the proactive network diagnosis module 132 may determine the occurrence of the event by comparing respective data associated with the first network node device 108 and the network node device 120 with one or more control thresholds. Additionally, and/or alternatively, the proactive network diagnosis module 132 may determine the occurrence of the event based on a machine learning model. For the first network node device 108, the proactive network diagnosis module 132 may determine that an intermittent network issues have occurred and a sustained node outage will not occur, indicated by a dash-dotted cross. For the second network node device 120, the proactive network diagnosis module 132 may determine that a sustained node outage will occur indicated by a dotted cross.

In some embodiments, the proactive network diagnosis module 132 may communicate with the service server 140 to take actions based on where the intermittent network issues have occurred for a specific node or a sustained node outage may occur. For example, the proactive network diagnosis module 132 may instruct the service server 140 to allocate resources based on data associated with the specific node and may dispatch a technician to locations associated with the specific node. In some embodiments, the proactive network diagnosis module 132 may send information associated with the issues and the node in near real-time or real-time to the service server 140. For example, the proactive network diagnosis module 132 may send a point of failure for the issues and associated data to the service server 140. As another example, the proactive network diagnosis module 132 may generate a graphical representation of a network topology overlaid with the points of failure. In some embodiments, the proactive network diagnosis module 132 may be included in the headend device 104. In some embodiments, the proactive network diagnosis module 132 may perform a polling process described in FIGS. 2A-2B.

FIGS. 2A-2B depict an example device polling process for a network 200, in accordance with one or more example embodiments of the disclosure. The example network 200 depicted in FIGS. 2A and 2B may be a DOCSIS network. However, it should be noted that this is merely for exemplification purposes, and the systems and methods described herein may similarly apply to any other type of network, including any other types of devices as well. The network 200 may include one or more network node devices 202 (e.g., one embodiment of the network node devices 108 and 120), one or more coaxial splitters 204, one or more amplifiers 206 (e.g., one embodiment of the amplifiers 110a, 110b, 122a, and 122b), one or more taps (e.g., tap 208, tap 208b, tap 208c, or any other number of taps) (for simplicity, reference may be made herein to "tap 208," which may represent any of the depicted taps) (e.g., one embodiment of the taps 112a, 112b, 124a, and 124b), one or more premises (e.g., premises 210a, . . . , premises 210g, or any other number of premises) (for simplicity, reference may be made herein to "premises 210," which may represent any of the depicted premises), and one or more CPEs (for example, CPE 212a, . . . , CPE 212i, or any other number of CPEs) (for simplicity, reference may be made herein to "CPE 212," which may represent any of the depicted CPEs) (e.g., one embodiment of CPEs 116a, 116b, 128a, and 128b). In some instances, a premises 210 may be a residential home or a commercial building. A CPE 212 may be a CPE or any other type of device that may be located in a customer's home or commercial building, such as a modem, for example. The example network 200 and its potential architectures may be described in more detail with respect to FIGS. 4 and 5.

In some embodiments, the polling process may begin by taking a representative sample of telemetry data from one or more of the most downstream devices in the network 200 (for example, the CPEs). The representative sample may include retrieving telemetry data from a subset of CPEs connected to each premise. For example, telemetry data may be retrieved for CPEs 212a, 212c, 212d, 212f, 212g, and 212h. The telemetry data may include, for example, identifying information for the device itself, such as the MAC address, device status, device DOCSIS profile, channel frequency, modulation profile, modulation type, and channel bandwidth, for example. The information may be provided by channel for each device. The telemetry data may also include performance data associated with the device, such as forward error correction information, upstream/downstream data transfer rates, signal-to-noise ratios, device power levels, cable modem termination system (CTMS) power levels, CMTS Equalization Coefficient, and device Equalization Coefficient. By retrieving telemetry data from each of these CPEs, a representative sampling of telemetry data for each premises on the network 200 may be quickly retrieved. In some instances, the CPEs that are polled may be changed through each polling iteration (for example, CPEs 212b, 212c, 212e, 212f, 212g, and 212i may be polled in a subsequent iteration), however, in other instances, the CPEs that are polled may remain the same.

In some embodiments, once the representative sample is obtained from the CPEs, it may be determined if any of the CPEs in the representative sample are experiencing an impairment. This determination may be made based on detected micro-reflections. The micro reflections may be a way of determining how much equalization is occurring on a network. Since pre-equalization may be a method for overcoming noise in a network, it may be assumed that high microreflections are indicative of network impairments.

Once it is determined that a CPE on the network 200 is experiencing an impairment, the full network mapping, as described above, may be performed. In the example provided in FIG. 2A, the CPE 212g is determined to be experiencing an impairment (for example, as indicated with the cross-through CPE 212g). The full network mapping may begin with polling (for example, retrieving telemetry data, as described above) from devices upstream from the CPE 212g until an upstream device with additional downstream devices is reached (for example, the tap 208c). Once this upstream device is reached, polling may be performed for both neighboring upstream devices (for example, tap 208b), as well as any other downstream device connected to the upstream device. This process may continue until all devices on the network 200 have been polled (or, in some cases, only a larger subset of devices on the network 200). This process may be illustrated in FIG. 2B. For instance, starting from tap 208c, premises 210g may be polled, and then the two CPEs 212h and 212i connected to the premises 210g may subsequently be polled. The retrieval of telemetry data may thus spread "outwards" from the common upstream device until all telemetry data for all devices on the network 200 has been retrieved. The result of this full network mapping as depicted in FIG. 2B may be that CPEs 212a, 212b, 212d, 212f, and 212h are also identified as experiencing an impairment along with CPE 212g. It should be noted that although FIG. 2B only depicts the mapping as reaching premises 210d and 210e, and the devices downstream from tap 208c. This is only for exemplary purposes, and the mapping may continue to spread until all of the devices on the network 200 are reached. In some embodiments, the above polling process may be performed by the system 100. The network 200 may be one embodiment of the cable network in the system 100.

Figure 3:
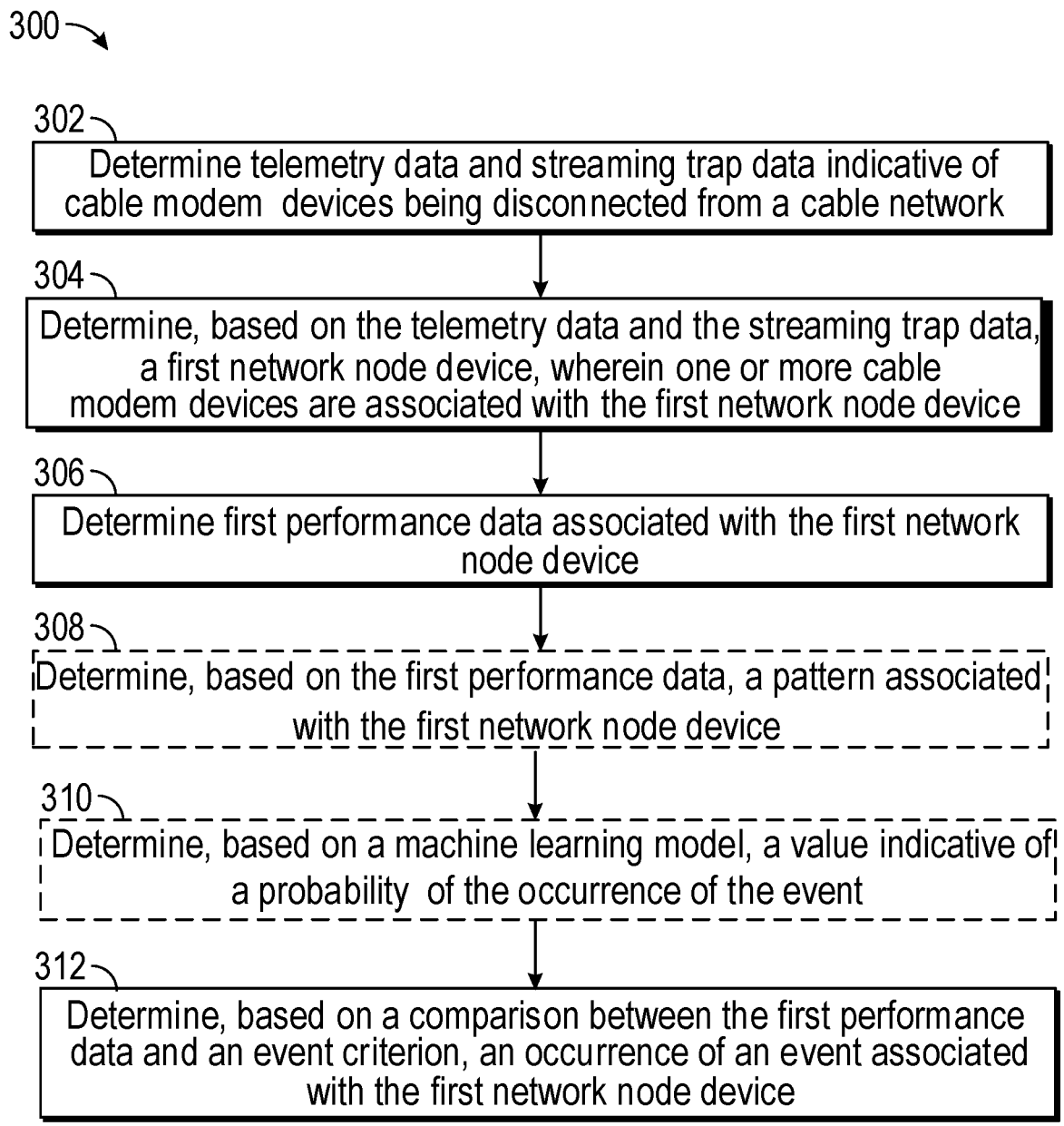
FIG. 3 depicts an example flow diagram showing a method for proactive network diagnosis, in accordance with one or more example embodiments of the present disclosure.

FIG. 3 depicts an example flow diagram showing a method 300 for proactive network diagnosis, in accordance with one or more example embodiments of the present disclosure. In FIG. 3, computer-executable instructions of one or more module(s) of the system 100, and/or the cable network 200 may be executed to perform the proactive network diagnosis.

At block 302 of the method 300 in FIG. 3, the method may include determining telemetry data and streaming trap data indicative of a group of cable modem devices being disconnected from a cable network. For example, a headend device (e.g., the headend device 104) of a system (e.g., the system 100 of FIG. 1) may request telemetry data from CPE devices associated with a tap (e.g., the tap 112a, 112b, 124a, or 124b in FIG. 1, or the tap 208 in FIGS. 2A and 2b) that is upstream to the CM devices (e.g., the CPE 116a, 116b, 128a, or 128b in FIG. 1, or the CPE 212 in FIGS. 2A and 2B) via a polling process described in FIGS. 2A and 2B. The headend device may capture the streaming trap data via an SNMP communication. The system 100 may select, based on the telemetry data and streaming trap data, one or more CM devices of the cable network of the system 100 or the cable network 200 that have been experiencing or experienced intermittent network issues (e.g., intermittently off) and/or sustained offline conditions (e.g., completely off).

At block 304, the method may include determining, based on the telemetry data and the streaming trap data, a first network node device, and a first CM device and a second CM device of the group of CM devices are associated with the first network node device. For example, the system may attribute the selected CM devices to a specific node based on the telemetry data and the streaming trap data. As shown in FIG. 1, the CPEs 116b, 128a, and 128b may be selected. The CPE 116b may be attributed to the first network node device 108. The CPE 128a and 128b may be attributed to the second network node device 120.

At block 306, the method may include determining first performance data associated with the first network node device. For example, in FIG. 1, the system 100 may determine performance data associated with the first network node device 108 or the second network node device 120. Performance data may include forward error correction information, upstream/downstream data transfer rates, signal-to-noise ratios (SNRs), modulation error ratios, measurement data to characterize one or more channels associated with signals outputted by CPEs (e.g., slopes measurement data, amplitude measurement data, ripple measurement data, spike (for example, non-linear noise distortions) measurement data, absolute received power per subcarrier measurement data, error vector magnitude measurement data, and the like), device power levels, CMTS power levels, a CMTS equalization coefficient, a device equalization coefficient, and/or any relevant data associated with a performance of the above devices.

At block 308, the method may include determining, based on the first performance data, a pattern associated with the first network node device. In some embodiments, a pattern may indicate a distribution (e.g., a statistical distribution, or the like) of the various types of performance data. In some embodiments, a pattern may indicate a change of particular performance data (e.g., a signal-to-noise ratio, or any relevant performance data) over a time period (e.g., a function of the performance data versus time). In some embodiments, a pattern may indicate a distribution of CM devices (e.g., CPEs having intermittently off and/or completely off) associated with a specific node. A node having been experiencing an intermittent network issue/having experienced an intermittent network issue/having a sustained node outage may be associated with a specific pattern.

At block 310, the method may include determining, based on a machine learning model, a value indicative of a probability of the occurrence of the event. For example, the system may generate a machine learning model. The system may train the machine learning model using historical data (e.g., known patterns, historical performance data) and associated intermittent network issues and sustained node outage. The system may input a detected pattern or measured performance data into the trained machine learning model and the trained machine learning model may output a value indicative of a probability of the occurrence of the event that describes a likelihood indicative of how likely an event may occur (e.g., how likely the intermittent network issues have occurred or the intermittent network issues have been occurring, and/or how likely the sustained node outage will occur). In some embodiments, the system may use the historical data to train a machine learning model to classify a node into different classifications (e.g., a classification indicative of nodes having been experiencing intermittent network issues, a classification indicative of nodes having experienced intermittent network issues, a classification indicative of nodes will experience a sustained node outage, a classification indicative of a bad node that is completely off, a classification indicative of a healthy node, or the like). The system may input a detected pattern or measured performance data into the trained machine learning model, and the trained machine learning model may output a likelihood indicative of a classification associated with a specific node.

At block 312, the method may include determining, based on a comparison between the first performance data and an event criterion, an occurrence of an event associated with the first node device. In some embodiments, the system may compare the first performance data with one or more control thresholds. If the first performance data deviates from the one or more control thresholds, the system may determine an occurrence of an event. If the first performance data does not deviate from one or more control thresholds, the system may determine that the event is not occurring, has not occurred, or will not occur. In some embodiments, the system may compare a detected pattern with a historical pattern. If the detected pattern match the historical pattern, the system may determine an occurrence of an event. If the detected pattern does not match the historical pattern, the system may determine that the event is not occurring, has not occurred, or will not occur. In some embodiments, the system may input the first performance data and/or detected pattern into a machine learning model to determine a value indicative of a probability of the occurrence of the event (e.g., a likelihood indicative of how likely an event may occur, or a likelihood indicative of a classification associated with a specific node). The system may compare the value with one or more probability thresholds. A probability threshold may describe a value or a value range indicative of whether or not the event may occur or of whether or not a classification the specific node may belong to. If the value deviates from a probability threshold, the system may determine the occurrence of the event. If the value does not deviate from the probability threshold, the system may determine that the event is not occurring, has not occurred, or will not occur. In some embodiments, the system may compare the value with multiple probability thresholds. The multiple probability thresholds may describe a value range indicative of whether or not the event may occur or of whether or not a classification the specific node may belong to. For example, if the value falls within a particular value range defined by a first probability threshold and a second probability threshold (e.g., the particular value range may be associated with a particular classification), the system may determine a particular classification the specific node may belong to.

Figure 4:
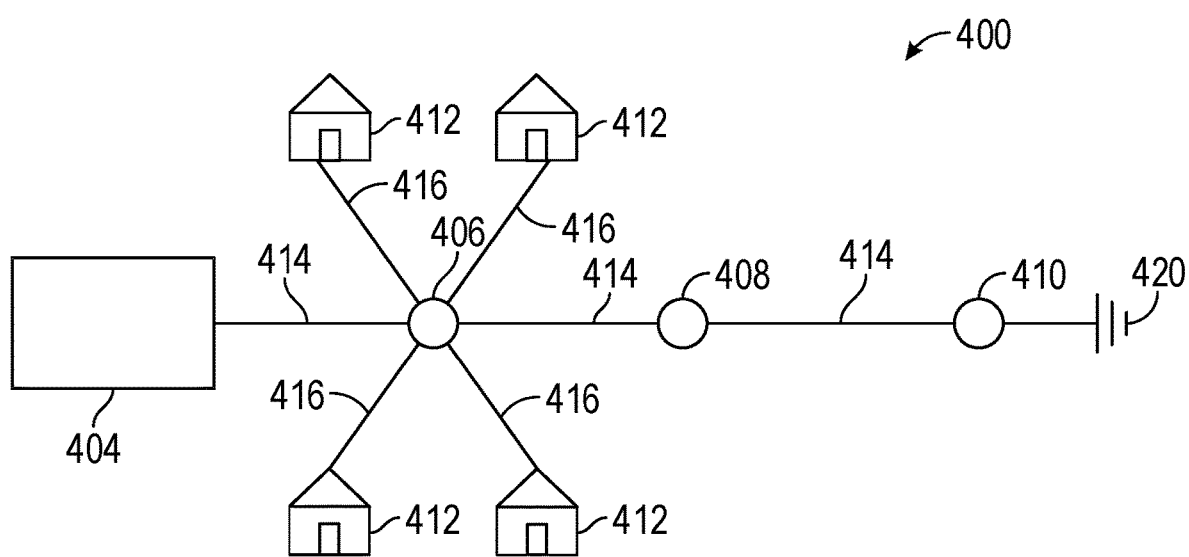
FIG. 4 depicts an example network architecture, in accordance with one or more example embodiments of the disclosure.

FIG. 4 shows an example diagram 400 of a portion of a cable network and associated devices in a particular network deployment, in accordance with example embodiments of the disclosure. In some instances, the cable network depicted in the example diagram 400 may be similar to the cable network of the system 100 and/or network 200, and may provide additional details regarding the potential network architecture of such networks described herein. In some aspects, the cable network described herein may be implemented using a DOCSIS specification. The device 404 may include a CMTS, which can also be referred to as an access controller, a controller, and/or a node herein. In an embodiment, the device 404 may have a converged cable access platform (CCAP) functionality. In another embodiment, the device 404 may serve as a remote physical (PHY) device, that is, a device having PHY layer functionality (that is, PHY layer functionality as described in connection with the open systems interconnection model, OSI model).

In an embodiment, there can be a fiber 414 connected to the device 404. The device 404 can further be connected to various network cable taps 406, 408, and 410, also referred to as taps or terminations herein, and can connect to various cable CPEs (e.g., CM devices), for example, at various households 412.

In some embodiments, a cable network can include a fiber optic network, which can extend from the cable operators' headend out to a neighborhood's hub site and finally to a coaxial cable node which serves customers, for example, 25 to 2000 households (or any number of other households, or even commercial buildings).

In an embodiment, data can be transmitted downstream from the device 404 to one or more homes 412 over drop cables 416 (also referred to as drops herein) using one or more taps 406, 408, and 410. In an embodiment, as the data is transmitted downstream from the device 404 to one or more homes 412, the taps 406, 408, and 410 can potentially generate various impairments on the network. Alternatively, or additionally, as the signals pass through from the device 404 to the taps 406, 408, and 410 over fibers 414 and to the homes 412 over one or more drops 416, the fibers 414 and/or the drops 416 can cause the signals to undergo various impairments, for example, to the power spectral density of the signals. In an embodiment, the impairment can be due to attenuation on the fibers 414 and/or drops 416. In an embodiment, the impairments can lead to frequency distortions on the signals; for example, the higher frequency end of the signals may be attenuated. Accordingly, in an embodiment, one or more amplifiers (not shown) can be used to perform a gain on the attenuated signals. In an embodiment, the one or more amplifiers can be placed, for example, at one or more of the taps 406, 408, and 410 to perform the gain on the attenuated signals.

In an embodiment, the homes 412, the devices in the homes 412, and taps 406, 408, and/or 410 can introduce different distortions on the drop cables 416 and/or fibers 414. In an embodiment if the distortion is introduced on a given fiber 414 feeding a first tap 406 of the taps 406, 408, and/or 410, different homes of the homes 412 may receive a similar distortion to signals being transmitted and received from one or more devices at the homes 412. In another embodiment, a distortion in a given tap of the taps 406, 408, and/or 410, a distortion at a given drop of the drops 416, or distortions associated with one or more cables and/or wires of one or more devices in a given home of the homes 412, may cause signals being received and transmitted at the various taps 406, 408, and/or 410, and/or signal being transmitted or received by the devices in the different homes 412 to undergo different signal distortions.

Likewise, in an embodiment, if the devices at various homes 412 are transmitting data upstream, the distortion to the signals experienced by devices at different homes 412 can be different. In an embodiment, the disclosed systems, methods, and apparatuses describe techniques by which various devices, for example, the various devices in the homes 412 may need to transmit to account for the different distortions on the network, as described above.

In an embodiment, a given transmitting device on the network can transmit a pre-determined sequence, for example a 32-symbol (or any suitable number of symbol) sequence where each symbol includes a pre-determined amount of data, to the receiving devices. Accordingly, when the receiving devices receive the pre-determined sequence, the receiving devices may be programmed to be able to determine one or more characteristics that the signal associated with the received pre-determined sequence should have. Therefore, the receiving device can determine whether there is a deviation from what the receiving device would have received absent distortions in the received signal.

In an embodiment, the receiving devices can take various measurements, for example, measurements to characterize one or more channels associated with signals received by the receiving device and/or one or more measurements associated with the received signal from the transmitting device, including, but not limited to, signal-to-noise ratio (SNR) measurements, modulation error ratios (MER) measurements, slopes measurements, amplitude measurements, ripple measurements, spike (for example, non-linear noise distortions) measurements, absolute received power per subcarrier measurements, error vector magnitude measurements, and the like. The receiving device can then transmit at least portions of the measurements in informational blocks, for example, as data packets, back to the transmitting device. The transmitting device can modify a table based on the received information from the receiving device, for example, a table stored in internal memory. In an embodiment, the table can include information such as what sequence the receiving device would have received absent any distortions to the signal, what sequence the receiving device actually received, what sequence the transmitting device received back from the receiving device (which may also be subject to further distortions), and/or any information indicative of the measurements taken by the receiving device of the channel and/or the received signal, as described above. In some embodiments, the CMTS or controller can determine interference groups (IGs) based on the received information from the receiving devices.

In some aspects, the cable network, as described above, can include a regional or area headend/hub. The hub can receive programming that is encoded, modulated and upconverted onto radio frequency (RF) carriers, combined onto a single electrical signal and inserted into a broadband transmitter, for example, an optical transmitter. In some embodiments, the transmitter can convert the electrical signal to a downstream modulated signal that is sent to the nodes. Fiber optic cables connect the headend or hub to nodes in various topologies, including, but not limited to, point-to-point or star topologies, ring topologies, and the like.

By using frequency-division multiplexing, an HFC network such as the one described in connection with FIG. 4 may carry a variety of services, for example, analog and digital TV, video on demand, telephony, data, and the like. Services on these systems can be carried on radio frequency (RF) signals in particular regions of the available spectrum.

The HFC network can be operated bi-directionally such that signals are carried in both directions on the same network. For example, the signals can be transmitted from the headend/hub office to the customer and from the customer to the headend/hub office. In one aspect, a forward-path or downstream signal can refer to information from the headend/hub office to the customer. In another aspect, a return-path or upstream signal can refer to information from the customer to the headend/hub office. The forward-path and the return-path can be carried over the same coaxial cable in both directions between the node and the customer equipment.

In some embodiments, HFC network can be structured to be asymmetrical. That is, data transmission in the downstream direction has much more data-carrying capacity than the upstream direction. Full Duplex can refer to a network specification that can improve upon DOCSIS 3.1 to use the full spectrum of the cable plant (for example, from approximately 0 MHz to approximately 1.2 GHz) at the same time in both upstream and downstream directions. This technology may facilitate multi-gigabit symmetrical services while remaining backward compatible with DOCSIS 3.1.

In some embodiments, the DOCSIS may include at least one of (i) a DOCSIS 1.0, (ii) a DOCSIS 2.0, (iii) a DOCSIS 3.0, (iv) a DOCSIS 3.1, or (v) a DOCSIS 4.0 specification.

Figure 5:
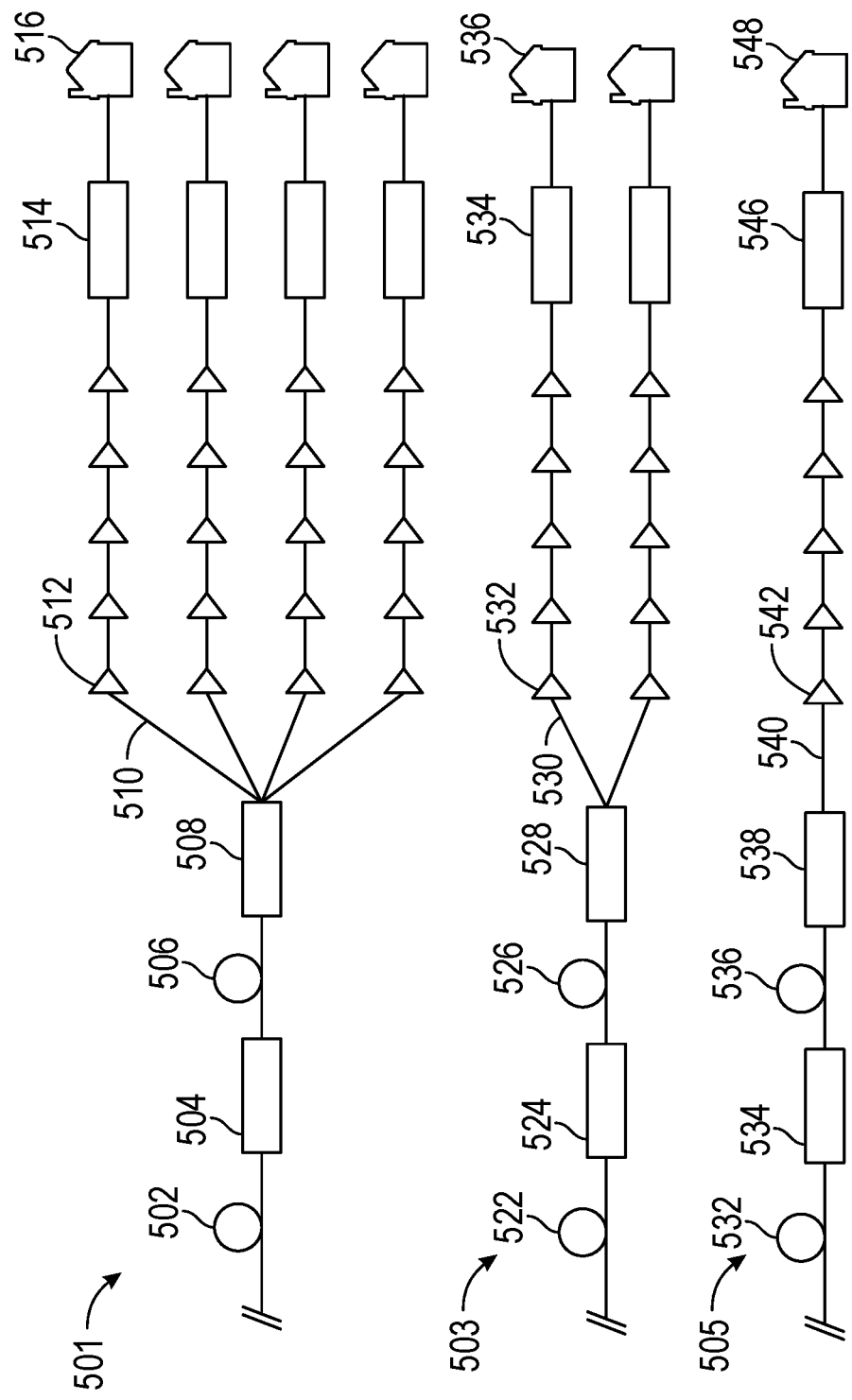
FIG. 5 depicts an example network architecture, in accordance with one or more example embodiments of the disclosure.

FIG. 5 shows example diagrams of another network architecture, in accordance with example embodiments of the disclosure. The network architecture may be similar to the cable network of the system 100 and/or network 200, and may provide additional details regarding the potential network architecture of such networks described herein. That is, the network of the system 100 and the network 200 may include elements of the network architectures depicted in FIGS. 4 and 5. In one embodiment, as shown in diagram 501, device 504 can represent a headend device. In one aspect, device 504 can include converged cable access platform (CCAP) device. CCAP can refer to equipment that combines aspects of the functionality of edge quadrature amplitude modulation (QAM) technology with cable model termination systems (CMTSs) to provide services such as internet and voice over IP while encoding and transmitting digital video channels over the cable network.

In one embodiment, the device 504 can be electronically connected to device 508, which can represent a network node device, for example, a network node device such as remote physical (PHY) device, remote medium access control (MAC) device, and/or remote hybrid PHY/MAC device. In one aspect, the electronic connection between device 504 and device 508 can be via a cable 506, for example, a fiber optic cable. In an embodiment, device 504 and/or 508 can encompass aspects of the functionality of a computing entity 600, described below. In one embodiment, one or more of the devices 504 and/or 508 can include a switch, for example, a network switch such as an Ethernet switch.

In some embodiments, as shown in diagram 501, the device 508 can be electronically connected to a customer premise, for example, a home 516 (also referred to herein as a household) and various devices associated with the home 516. In another aspect, the device 508 can be connected to the home 516 through one or more amplifiers 512, and/or one or more taps 514. In some respects, the amplifiers can serve to amplify signals to restore attenuation of the signals during propagation over the network. In another aspect, diagram 501 can represent a node-x embodiment, where node-x can represent a node having a variable number of amplifiers at a given node split. In particular, in diagram 501, the network can have five amplifiers in each of the four node splits.

Similarly, as shown in diagram 503, the device 528 can be electronically connected to a customer premise, for example, a home 536 (also referred to herein as a household) and various devices associated with the home 536. In another aspect, the device 528 can be connected to the home 536 through one or more amplifiers 532, and/a tap 534. In the case of diagram 503, the number of node splits at the device 528 can be less than the number of node splits in diagram 501 (e.g., two-node splits vs. four-node splits).

Similarly, as shown in diagram 505, the device 538 can be electronically connected to a customer premise, for example, a home 548 (also referred to herein as a household) and various devices associated with the home 548. In another aspect, the device 538 can be connected to the home 548 through one or more amplifiers 542 and a tap 546. In the case of diagram 505, the number of node splits at the device 538 can be less than the number of node splits in diagram 503 (e.g., zero-node splits vs. two-node splits). Accordingly, diagram 503 can represent a node-zero architecture, which can work without amplifiers.

In some embodiments, the disclosure describes providing the cable networks, such as the node-x and node-zero cable network deployments described above, with the ability to turn off sounding and resource block allocations in a given portion of the spectrum associated with FDX operation. Further, the disclosure describes configuring that portion of the spectrum as being static (i.e., not dynamic) with regard to changes in the starting and ending frequency. In some aspects, the disclosure describes simulating a hisplit using FDX.

As mentioned, lowsplit can refer to an approximately 5 MHz to approximately 42 MHz split in the United States. Midsplit can refer to an approximately 5 MHz to approximately 85 MHz split in the United States. Hisplit can refer to an approximately 5 MHz to approximately 204 MHz split in the United States; however, hisplit may not be generally deployed. In some embodiments, if amplifiers are used in a network that makes use of the node-x, the amplifiers may need to be replaced with devices having an approximately 5 MHz to approximately 204 MHz (or higher, up to approximately 684 MHz) return and an approximately 1 GHz to approximately 1.2 GHz forward capability.

In some embodiments, the system represented by diagram 501 (and similarly for diagrams 503 and 505, implicitly described in the following) may include a source (not shown) which may be connected to device 504 via cables 502 and 506. In another aspect, the system can include additional devices 504 and 508 and a tap or terminator 514. The source may be configured to provide a downstream broadband signal to one or more customer devices and receive upstream signals from the one or more customer devices, for example, customer devices at the homes 516. The devices 504 and 508 may be configured (i) to receive the downstream broadband signal via the cables 502 and 506, (ii) convert the downstream broadband signal into a radio frequency downstream signal, (iii) output the downstream broadband signal onto one or more cable lines (for example, cables 502 and 506) for communication to the one or more customer devices, (iv) receive the upstream signals via the one or more cable lines, and (v) convert the received upstream signals into light signals for communication to the source via the cables 502 and 506. The terminator 514 may be in communication with the devices 504 and 508 via the cables, and the terminator 514 may be configured to output the radio frequency downstream signal for receipt by the one or more customer devices and direct the communication of the upstream signals to the optical fiber node via the one or more cables.

In some embodiments, the source may be a suitable source of broadband content, such as a cable plant. The source may be configured to generate and/or combine any number of data streams and/or data components into a broadband signal that is output by the source for receipt by one or more households, for example, homes 516. For example, the source may be configured to obtain video data streams from one or more content providers, such as television networks, premium content providers, and/or other content providers, and the source may be configured to generate a broadband signal based at least in part on the video data streams. As desired, the source may insert commercials and/or other data into a television or video component of a broadband signal. Additionally, the source may be configured to generate or obtain any number of data components that are inserted or added to a broadband signal, such as television guide data, an Internet data signal, home security data signals, voice over internet protocol (VoIP) telephone signals, etc. Any number of modulation techniques and/or data standards may be utilized by a source in the generation or compilation of a broadband data signal. For example, television data may be modulated utilizing a suitable quadrature amplitude modulation (QAM) or other modulation technique, and the modulated data may be incorporated into the broadband data signal. As another example, an orthogonal frequency-division multiple access (OFDMA) technique, a time division multiple access (TDMA) technique, an advanced time division multiple access (ATDMA) technique, a synchronous code division multiple access (SCDMA) technique, or another suitable modulation technique or scheme may be utilized to modulate data included within the broadband data signal. The broadband data signal may be configured to provide a wide variety of services to one or more households, including but not limited to, television service, telephone service, Internet service, home monitoring service, security service, etc.

In certain embodiments, the generated broadband signal may be output utilizing one or more cables 502 and/or 506, for example, fiber optic cables or optical fibers that are configured to carry the broadband signal from the source to one or more corresponding devices, for example, devices 504 and 508. For example, the radio frequency broadband signal may be processed utilizing one or more suitable wavelength-division multiplexing (WDM) devices or WDM systems, and the processed signal may be provided to or driven onto an optical fiber. A wide variety of different types of WDM devices may be utilized as desired in various embodiments of the disclosure, such as dense WDM devices and add-drop WDM devices. As desired, a WDM device may include a terminal multiplexer component that includes one or more wavelength-converting transponders. Each wavelength-converting transponder may receive one or more components of the input broadband signal and convert that signal into a light signal using a suitable laser, such as a 1550 nm band laser. The terminal multiplex may also contain an optical multiplexer configured to receive the various 1550 nm band signals and place or drive those signals onto a single optical fiber.

As desired, the WDM device may amplify the broadband signals that are processed by the WDM device. Additionally or alternatively, one or more line repeaters or other amplifying devices (such as amplifiers 512) may be positioned along a length of the optical fiber in order to amplify the broadband signal and compensate for any losses in optical power.

In addition to processing downstream or forward-path signals that are received from the source, the WDM device may be configured to receive and process upstream signals that are communicated to the source from the households, for example, from homes 516. Cables, for example cables 502 and 506 (which can include, for example, optical fibers) may be configured to carry broadband signals between the source the devices 504 and 508, and the taps 514. These signals may include forward path signals generated by the source and return path signals generated by one or more households, for example, from homes 516. A wide variety of different optical fibers may be utilized as desired in various embodiments of the disclosure, such as multi-mode fibers, single-mode fibers, and special-purpose fibers. Additionally, the optical fibers may be constructed from a wide variety of different materials, such as silica, fluorides, phosphates, and/or chalcogenides. The optical fibers may be configured to carry signals as light pulses utilizing total internal reflection.

Moreover, any number of devices 504 and 508, which can alternatively or additionally be referred to as fiber nodes may be provided. Each fiber node may be configured to receive and process downstream or forward path signals from the source. Additionally, each fiber node may be configured to receive and process upstream or return path signals received from the one or more households.

In some embodiments, once a signal has been filtered out or otherwise isolated by the amplifiers 512, the amplifiers 512 may amplify the signal. For example, the amplifiers 512 may increase the amplitude of the signal. In certain embodiments, the various components of a broadband signal (e.g., low return path, forward path, high return path) may be amplified by respective amplification components of the amplifiers 512. Each amplified signal may then be output onto or driven back onto the cable line in a desired direction for the signal. As desired, any number of diodes or other suitable devices may be incorporated into the amplifiers 512 in order to prevent or limit undesired leakage of an amplified signal in a direction from which the signal was received. For example, the amplifiers 512 may receive a return path signal from a terminator 514 or other amplifier, the amplifiers 512 may amplify the signal, and the amplifier may output the signal in an upstream direction towards devices 504 and 508 and/or source while limiting the output or leakage of the signal in a downstream direction.

The amplifiers 512 may include a wide variety of gains as desired in various embodiments of the disclosure. Additionally, as desired, different gains may be utilized for different components of a broadband signal. In certain embodiments, the amplifiers 512 may be powered by a received broadband signal, such as a received downstream signal. Additionally or alternatively, the amplifiers 512 may be powered by one or more batteries and/or external power sources. In certain embodiments, the power requirements of the amplifiers 512 may be based at least in part on the modulation technique(s) utilized in association with the broadband signals that are amplified. In one example embodiment, a relatively low-power amplifier may be provided in association with an OFDMA modulation technique.

Any number of terminators 514 or taps may be connected to a cable line. A terminator 514 may form an access point from which one or more households, such as households 516, may be provided with broadband services. Any number of households may be serviced by a terminator 514 as desired in various embodiments of the disclosure. For example, in certain embodiments, up to four households may be serviced by a terminator 514. As desired, a cable drop or other signal line (e.g., a coaxial cable or RF cable) may extend from the terminator 514 to a household 516. In this regard, signals may be provided to and/or received from the household 516.

In an embodiment, the signals transmitted between the CTMS and the CMs can be purified via echo cancellation both in the analog and digital domain. In another embodiment, an analog echo canceller can reduce the echoes of the signal in the analog domain. In an embodiment the analog echo canceller can reduce the echo, group delay, noise amplitude, and the like, of the signal. The signal can, alternatively or additionally, proceed to an analog-to-digital converter (ADC) for conversion to the digital domain. In an embodiment, the signal can proceed thereafter to a digital echo canceller, which can remove echoes and the like in the digital domain. In an embodiment, the output of the digital echo canceler can be transmitted from the CMTS to a device, for example, a cable CPE.

Figure 6:
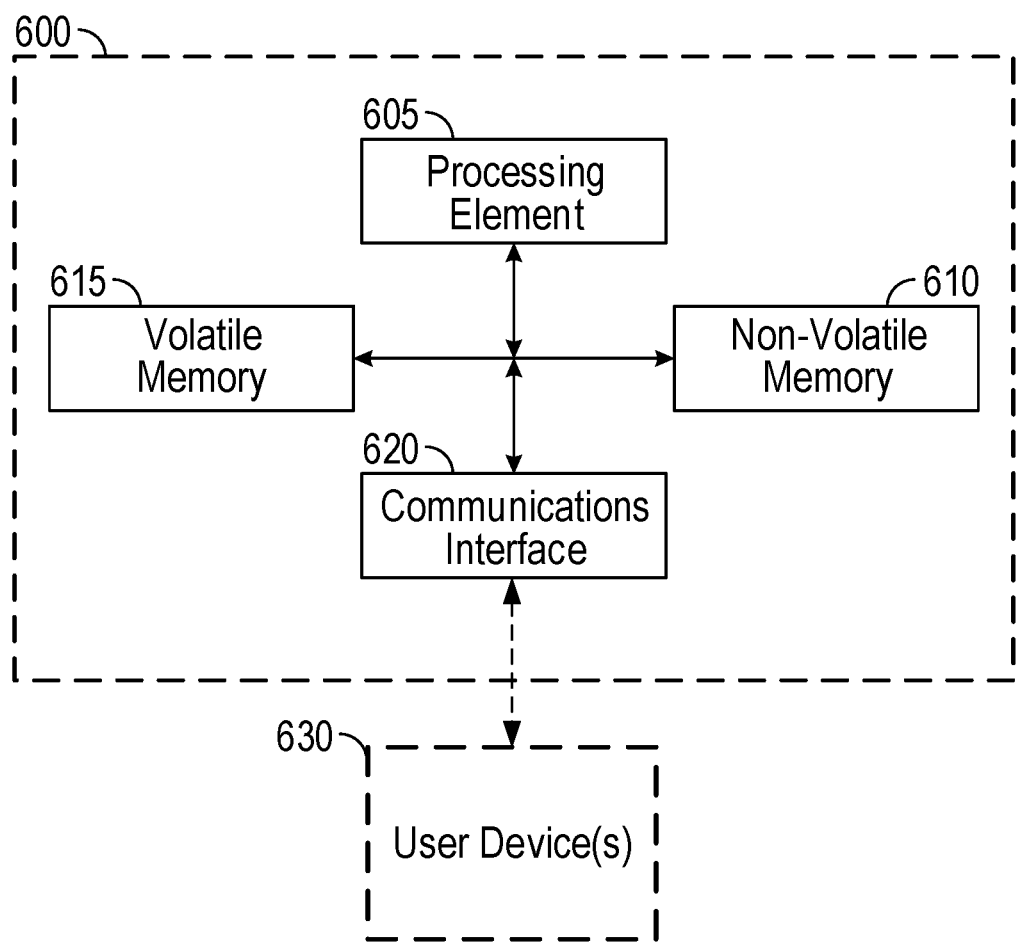
FIG. 6 depicts an example computing entity, in accordance with one or more example embodiments of the disclosure.

FIG. 6 provides a schematic of a network computing entity 600 according to one embodiment of the present disclosure. The computing entity may be used to perform any of the operations described herein, such as the proactive network diagnosis and/or polling process described with respect to any of FIGS. 1-3, for example. The network computing entity 600 may be one embodiment of the remote computing server 130. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, and the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the network computing entity 600 may also include one or more communications interface(s) 620 for communicating with various computing entities, such as by communicating data, content, information, and/or similar terms used herein interchangeably that can be transmitted, received, operated on, processed, displayed, stored, and/or the like. For instance, the network computing entity 600 may communicate with user devices 630 (e.g., mobile phone, laptop, computer or the like) and/or a variety of other computing entities.

As shown in FIG. 6, in one embodiment, the network computing entity 600 may include or be in communication with one or more processing element(s) 605 (also referred to as processors, processing circuitry, and/or similar terms used herein interchangeably) that communicate with other elements within the network computing entity 600 via a bus, for example. As will be understood, the processing element 605 may be embodied in a number of different ways. For example, the processing element 605 may be embodied as one or more complex programmable logic devices (CPLDs), microprocessors, multi-core processors, coprocessing entities, application-specific instruction set processors (ASIPs), microcontrollers, and/or controllers. Further, the processing element 605 may be embodied as one or more other processing devices or circuitry. The term circuitry may refer to an entirely hardware embodiment or a combination of hardware and computer program products. Thus, the processing element 605 may be embodied as integrated circuits, application-specific integrated circuits (ASICs), field-programmable gate arrays (FPGAs), programmable logic arrays (PLAs), hardware accelerators, other circuitry, and/or the like. As will, therefore, be understood, the processing element 605 may be configured for a particular use or configured to execute instructions stored in volatile or non-volatile media or otherwise accessible to the processing element 605. As such, whether configured by hardware or computer program products or by a combination thereof, the processing element 605 may be capable of performing steps or operations according to embodiments of the present disclosure when configured accordingly.

In one embodiment, the network computing entity 600 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 610, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the network computing entity 600 may further include or be in communication with volatile media (also referred to as volatile storage, memory, memory storage, memory circuitry and/or similar terms used herein interchangeably). In one embodiment, the volatile storage or memory may also include one or more volatile storage or memory media 615, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 605. Thus, the databases, database instances, database management systems, data, applications, programs, program modules, scripts, source code, object code, byte code, compiled code, interpreted code, machine code, executable instructions, and/or the like may be used to control certain aspects of the operation of the network computing entity 600 with the assistance of the processing element 605 and operating system.

As indicated, in one embodiment, the network computing entity 600 may also include one or more communications interfaces 620 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the network computing entity 600 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the network computing entity 600 may include or be in communication with one or more input elements, such as a keyboard input, a mouse input, a touch screen/display input, motion input, movement input, audio input, pointing device input, joystick input, keypad input, and/or the like. The network computing entity 600 may also include or be in communication with one or more output elements (not shown), such as audio output, video output, screen/display output, motion output, movement output, and/or the like.

As will be appreciated, one or more components of the network computing entities 600 may be located remotely from other network computing entity 600 components, such as in a distributed system. Furthermore, one or more of the components may be combined, and additional components performing functions described herein may be included in the network computing entity 600. Thus, the network computing entity 600 can be adapted to accommodate a variety of needs and circumstances. As will be recognized, these architectures and descriptions are provided for example purposes only and are not limiting to the various embodiments.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on a computer storage medium for execution by, or to control the operation of, an information/data processing apparatus. Alternatively, or in addition, the program instructions can be encoded on an artificially generated propagated signal, e.g., a machine-generated electrical, optical, or electromagnetic signal, which is generated to encode information/data for transmission to a suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatuses, devices, and machines for processing data, including by way of example a programmable processor, a computer, a system on a chip, or multiple ones or combinations of the foregoing. The apparatus can include special-purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, a software application, a script, or code) can be written in any form of programming language, including compiled or interpreted languages and declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on the input of information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by or incorporated in, special-purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of the client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order or that all illustrated operations be performed to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A system comprising:
   at least one processor; and
   at least one memory storing computer-executable instructions, that when executed by the at least one processor, cause the at least one processor to:
      determine, at a first time, first telemetry data associated with a first subset of a group of cable modem devices, wherein the group of cable modem devices is associated with a cable network including one or more devices located downstream from a first network node device;
      determine, at a second time, second telemetry data associated with a second subset of the group of cable modem devices, wherein the second subset of the group of cable modem devices is different than the first subset of the group of cable modem devices;
      determine first streaming trap data indicative of an impairment of a first cable modem device of the second subset of the group of cable modem devices the, wherein the first telemetry data the first streaming trap data, and the second telemetry data are received from a cable modem termination system that communicates with the group of cable modem devices via the first network node device, wherein the first streaming trap data includes a micro-reflection;
      determine, based on the second telemetry data indicating the impairment of the first cable modem device, a full poll of the one or more devices included within the cable network downstream from the first network node device, the full poll comprising:

identify a first network tap upstream from a first cable modem device of the group of cable modem devices;

determine third telemetry data associated with the first network tap;

identify all remaining network taps in the cable network; and determine, subsequent to identifying the remaining network taps, fourth telemetry data associated with the remaining network taps and any cable modem devices located downstream from the remaining network taps;

generate first performance data associated with the first network node device;

determine, based on a comparison between the first performance data and an event criterion, an occurrence of an intermittent event associated with the first network node device;

determine, based on a machine learning model and the occurrence of only the intermittent event and without identifying a prior sustained event, a probability value indicative of a probability of a future occurrence of a sustained event;

determine that the probability value satisfies both a first threshold and a second threshold that is different than the first threshold; and determine, based on the probability value satisfying the first threshold and second threshold, that a future sustained event will occur.

2. The system of claim 1, wherein the computer-executable instructions further cause the at least one processor to:

determine second performance data associated with a second network node device; and determine, based on a comparison between the second performance data and the event criterion, an occurrence of an event associated with the second network node device.

3. The system of claim 1, wherein the event criterion comprises one or more control thresholds, one or more probability thresholds, and one or more historical data.

4. The system of claim 1, wherein the computer-executable instructions further cause the at least one processor to:

determine, based on the first performance data, a pattern associated with the first network node device; and determine, using the machine learning model and based on the pattern, a classification for the first network node device, wherein determining the occurrence of the intermittent event or the sustained event is based on the classification.

5. The system of claim 1, further comprising allocating, based on the value indicative of a probability of a future occurrence of a sustained event, one or more resources to locations associated with the first network node device.

6. The system of claim 4, wherein the classification includes at least one of: a node that is experiencing intermittent network issues, a node that will experience a sustained outage, a node that is permanently offline, and a healthy node.

7. The system of claim 5, wherein allocating the one or more resources comprises sending an indication for a technician to perform maintenance on the first network node device.

8. A method comprising:

determining, by one or more processors and at a first time, first telemetry data associated with a first subset of a group of network node devices, wherein the group of cable modem devices is associated with a cable network including one or more devices located downstream from a first network node device;

determining, at a second time, second telemetry data associated with a second subset of the group of cable modem devices, wherein the second subset of the group of cable modem devices is different than the first subset of the group of cable modem devices;

determining, first streaming trap data indicative of an impairment of a first cable modem device of the second subset of the group of cable modem devices, wherein the first telemetry data and the first streaming trap data, and the second telemetry data are received from a cable modem termination system that communicates with the group of cable modem devices via the first network node device, wherein the first streaming trap data includes a micro-reflection;

determining, based on the second telemetry data indicating the impairment of the first cable modem device, a full poll of the one or more devices included within the cable network downstream from the first network node device, the full poll comprising:

identifying a first network tap upstream from a first cable modem device of the group of cable modem devices;

determining third telemetry data associated with the first network tap;

identifying all remaining network taps in the cable network; and determining, subsequent to identifying the remaining network taps, fourth telemetry data associated with the remaining network taps and any cable modem devices located downstream from the remaining network taps;

generating first performance data associated with the first network node device;

determining, based on a comparison between the first performance data and an event criterion, an occurrence of an intermittent event associated with the first network node device; and determining, based on a machine learning model and the occurrence of only the intermittent event and without identifying a prior sustained event, a probability value indicative of a probability of a future occurrence of a sustained event;

determining that the probability value satisfies both a first threshold and a second threshold that is different than the first threshold; and determining, based on the probability value satisfying the first threshold and second threshold, that a future sustained event will occur.

9. The method of claim 8, further comprising:

determining second performance data associated with a second network node device; and determining, based on a comparison between the second performance data and the event criterion, an occurrence of an event associated with the second network node device.

10. The method of claim 8, wherein the event criterion comprises one or more control thresholds, one or more probability thresholds, and one or more historical data.

11. The method of claim 8, further comprising:

determining, based on the first performance data, a pattern associated with the first network node device; and determining, using the machine learning model and based on the pattern, a classification for the first network node device, wherein determining the occurrence of the intermittent event or the sustained event is based on the pattern.

12. The method of claim 8, further comprising allocating, based on the value indicative of a probability of a future occurrence of a sustained event, one or more resources to locations associated with the first network node device.

13. A non-transitory computer readable medium including computer-executable instructions stored thereon, which when executed by one or more processors of a wireless access point, cause the one or more processors to perform operations of:
    determining, at a first time, first telemetry data associated with a first subset of a group of cable modem devices, wherein the group of cable modem devices is associated with a cable network including one or more devices located downstream from a first network node device;
    determining, at a second time, second telemetry data associated with a second subset of the group of cable modem devices, wherein the second subset of the group of cable modem devices is different than the first subset of the group of cable modem devices;
    determining first streaming trap data indicative of an impairment of a first cable modem device of the second subset of the group of cable modem devices, wherein the first telemetry data, the first streaming trap data, and the second telemetry data are received from a cable modem termination system that communicates with the group of cable modem devices via the first network node device, wherein the first streaming trap data includes a micro-reflection;
    determining, based on the second telemetry data indicating the impairment of the first cable modem device, a full poll of the one or more devices included within the cable network downstream from the first network node device, the full poll comprising:
        identifying a first network tap upstream from a first cable modem device of the group of cable modem devices;
        determining third telemetry data associated with the first network tap;
        identifying all remaining network taps in the cable network; and
        determining, subsequent to identifying the remaining network taps, fourth telemetry data associated with the remaining network taps and any cable modem devices located downstream from the remaining network taps;
    generating first performance data associated with the first network node device;
    determining, based on a comparison between the first performance data and an event criterion, an occurrence of an intermittent event associated with the first network node device;
    determining, based on a machine learning model and the occurrence of only the intermittent event and without identifying a prior sustained event, a probability value indicative of a probability of a future occurrence of a sustained event;
    determining that the probability value satisfies both a first threshold and a second threshold that is different than the first threshold; and
    determining, based on the probability value satisfying the first threshold and second threshold, that a future sustained event will occur.

14. The non-transitory computer readable medium of claim 13, further comprising:
    determining second performance data associated with a second network node device; and
    determining, based on a comparison between the second performance data and the event criterion, an occurrence of an event associated with the second network node device.

15. The non-transitory computer readable medium of claim 13, further comprising:
    determining, based on the first performance data, a pattern associated with the first network node device,
    wherein determining the occurrence of the intermittent event or the sustained event is based on the pattern.

* * * * *